(No Model.)
I. J. MARTIN.
PLOW POINT.
No. 383,402. Patented May 22, 1888.
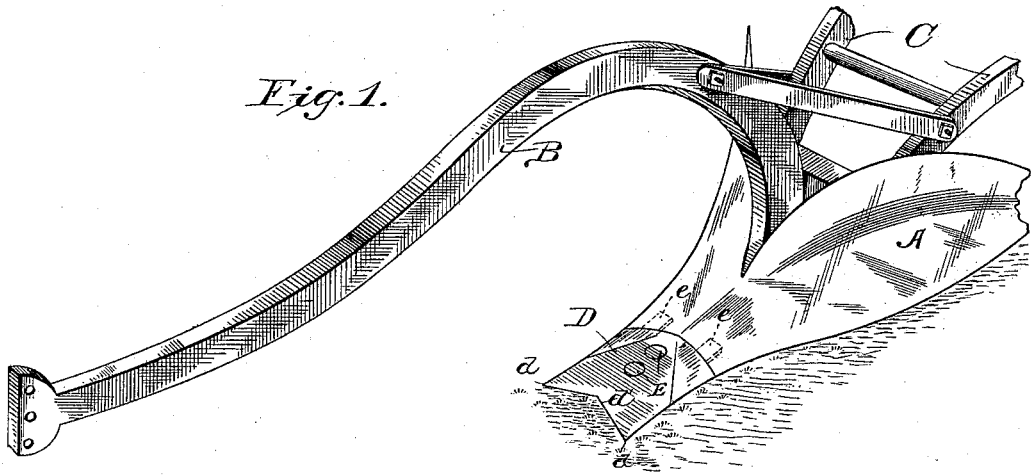
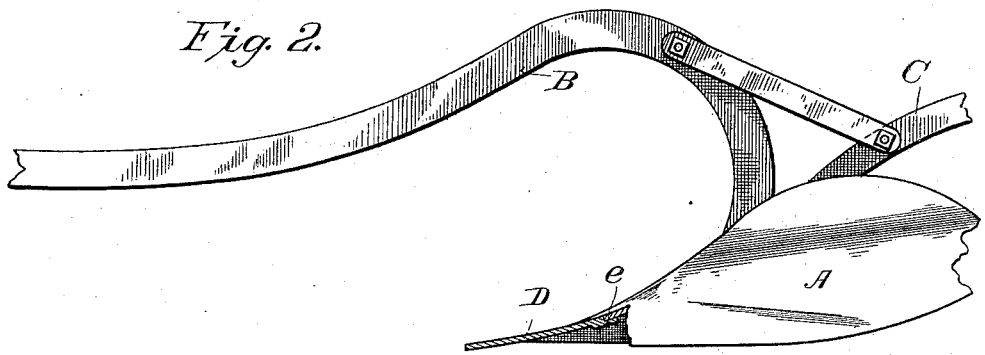
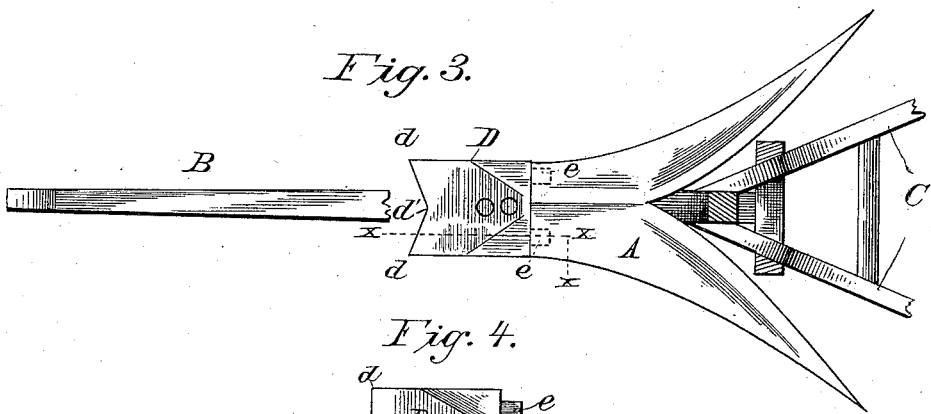
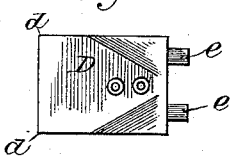
Witnesses,
Inventor,
By his Attorney's

UNITED STATES PATENT OFFICE.

ISAAC JASPER MARTIN, OF HONEY GROVE, TEXAS.

PLOW-POINT.

SPECIFICATION forming part of Letters Patent No. 383,402, dated May 22, 1888.

Application filed June 9, 1887. Serial No. 240,770. (No model.)

*To all whom it may concern:*

Be it known that I, ISAAC JASPER MARTIN, a resident of Honey Grove, in the county of Fannin and State of Texas, have invented certain new and useful Improvements in Plow-Points; and I do hereby declare the following to be a full, clear, and exact description of the invention, such as will enable others killed in the art to which it pertains to make and use the same.

My invention relates to improvements in plow-points, and is fully described and explained in this specification, and shown in the accompanying drawings, in which—

Figure 1 is a perspective view of a plow provided with my improved point. Fig. 2 is a side elevation of the plow, the point being shown in vertical section, the plane of section being passed through the broken line $x\ x\ x$, Fig. 3. Fig. 3 is a plan of the plow, the beam being broken away to show the point; and Fig. 4 is a plan of a modified form of the point.

In these views, A is the preferably symmetrical mold-board.

B is the beam, and C are the handles, of a plow of ordinary construction.

D is a point attached to the lower end of the beam by means of one or more bolts, E, and having its front edge approximately horizontal and its corners $d$ symmetrical with reference to the beam. The front edge of the plow-point, between the corners $d\ d$, may be a straight line, as shown in Fig. 4, but is preferably a broken line, forming a re-entrant angle, such as is shown in Figs. 1 and 3. I have found in practice that while the square horizontal front edge is effective in cultivating corn or other crops, cutting weeds and grass between the rows, and removing stalks or other obstructions, the edge formed with the re-entrant angle, such as is shown in Figs. 1 and 3, produces still more satisfactory results.

The bolts E E may be depended on entirely for attachment of the plow-point to the beam of the plow; but I prefer to supplement this connection by the use of lugs $e\ e$, formed integral with or rigidly fastened to the rear edge of the plow-point, and adapted to lie under and engage the front end of the mold board or shovel of the plow when the point is attached to the beam. The form of these lugs and their exact location is immaterial; but I prefer to place them approximately as shown in the drawings, and to give them substantially the form illustrated. Where these retaining-lugs are used, I have found that a single bolt passed through the point and entering the beam is sufficient, and, furthermore, they preserve the continuity of the surface of the point with that of the mold-board perfectly, with but slight trouble and expense in fitting.

Having now described and explained my invention, what I claim as new, and desire to secure by Letters Patent, is—

The combination, with the double mold-board A, rigidly fixed to the curved beam B in the rear of the lower end thereof, of the point D, having symmetrical corners $d$, and lugs $e$, adapted to pass beneath the front edge of said mold-board and prevent rocking of the point upon the beam, to which alone it is attached, and bolts E, securing said point in position.

In testimony whereof I have signed this specification in the presence of two subscribing witnesses.

ISAAC JASPER MARTIN.

Witnesses:
W. H. GROSS,
J. M. TERRY.